United States Patent
Krause et al.

(10) Patent No.: US 7,689,380 B2
(45) Date of Patent: Mar. 30, 2010

(54) DEVICE AND METHOD FOR SENSING A POSITION OF A DRIVE UNIT

(75) Inventors: Uwe Krause, Pattensen (DE); Heinz Ludwig, Garbsen (DE); Uwe Nolte, Barsinghausen (DE); Guido Sonntag, Gehrden (DE)

(73) Assignee: Siemens Aktiengesellschaft, Munich (DE)

( * ) Notice: Subject to any disclaimer, the term of this patent is extended or adjusted under 35 U.S.C. 154(b) by 230 days.

(21) Appl. No.: 11/974,893

(22) Filed: Oct. 16, 2007

(65) Prior Publication Data

US 2008/0177501 A1 Jul. 24, 2008

(30) Foreign Application Priority Data

Oct. 16, 2006 (DE) ............ 10 2006 048 851

(51) Int. Cl.
*G01B 11/26* (2006.01)

(52) U.S. Cl. .......................... 702/151; 710/104

(58) Field of Classification Search .......... 702/150, 702/151; 318/443, 466; 710/104; 701/49
See application file for complete search history.

(56) References Cited

U.S. PATENT DOCUMENTS

| 7,339,338 B2 * | 3/2008 | Theile et al. ............. 318/466 |
| 2009/0094396 A1 * | 4/2009 | Kram et al. ............. 710/104 |

FOREIGN PATENT DOCUMENTS

| DE | 10041738 A1 | 3/2002 |
| EP | 0328093 A2 | 8/1989 |
| EP | 0335161 A2 | 10/1989 |
| EP | 0340481 A1 | 11/1989 |
| JP | 62213587 A | 9/1987 |

* cited by examiner

*Primary Examiner*—John H Le

(57) ABSTRACT

The invention relates to a device and a method for sensing a position of a drive unit, in which the position can be sensed by an incremental signal transmitter having a first degree of accuracy which is described by a first travel increment or angle increment, and can be fed to a converter by which the first degree of accuracy of the sensing of the position can be reduced to a second degree of accuracy which is described by a second travel increment or angle increment.

19 Claims, 2 Drawing Sheets

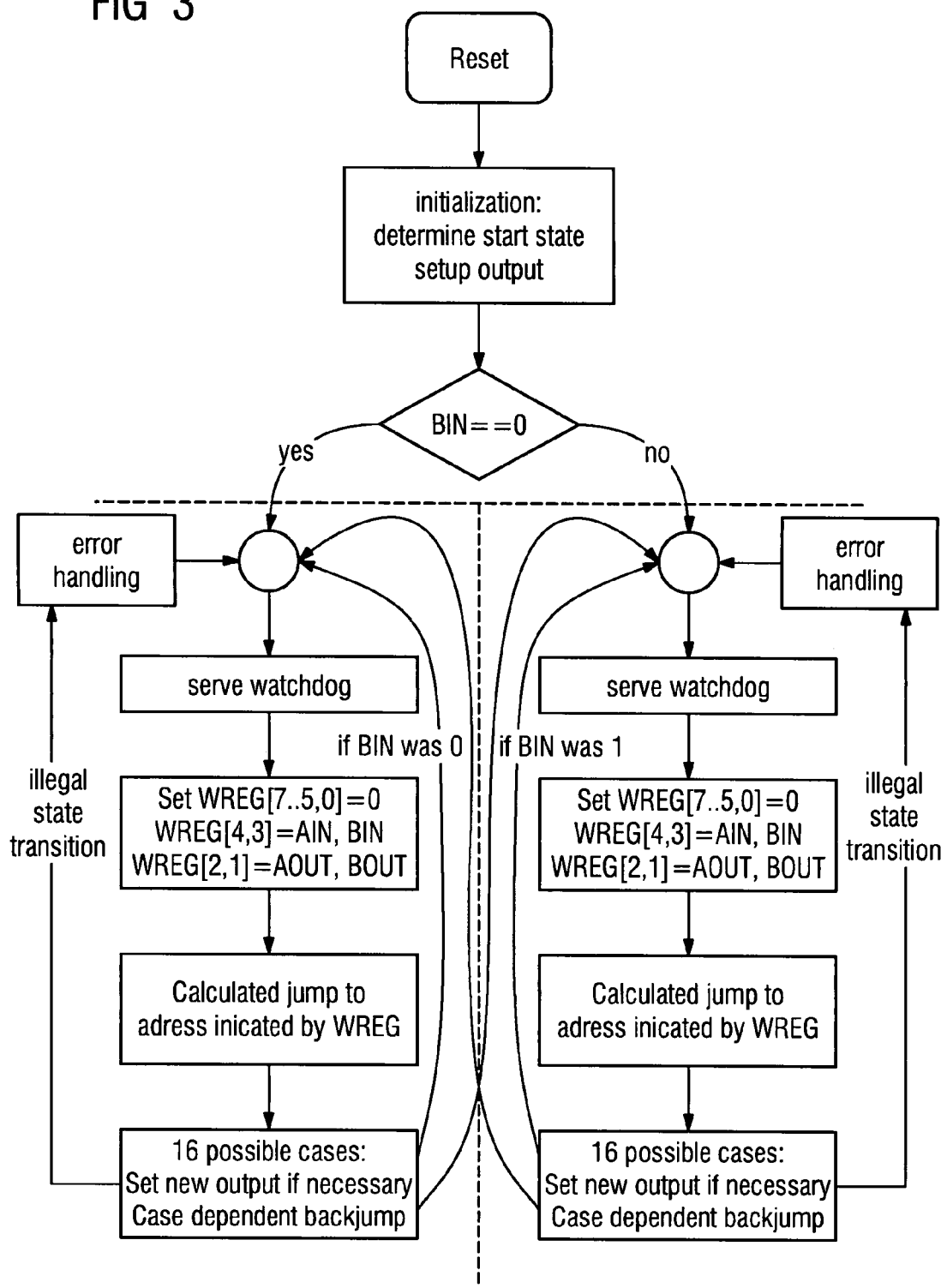

DEVICE AND METHOD FOR SENSING A POSITION OF A DRIVE UNIT

CROSS REFERENCE TO RELATED APPLICATIONS

This application claims priority of German Patent Office application No. 10 2006 048 851.2 filed Oct. 16, 2006, which is incorporated by reference herein in its entirety.

FIELD OF INVENTION

The invention relates to a device and a method for sensing a position of a motor-operator drive unit, for example a door which can be activated automatically or a vehicle seat.

BACKGROUND OF THE INVENTION

Incremental signal transmitters, also referred to as quadrature encoders and which can sense speed and position, are frequently used for performing open-loop control of motors, in particular for activating sliding doors or elevator doors. These incremental signal transmitters are available in a large number of resolutions. Resolution is understood here, for example, to mean the number of increments, i.e. subsections, which are represented by corresponding signals, into which a specific section, or in the case of incremental signal transmitters which are embodied as rotary encoders a full circle which is run through, is divided. Incremental signal transmitters with frequently required resolutions are usually available at favorable cost owing to the relatively large numbers in which they are produced. However, if a relatively rare resolution is required, the corresponding incremental signal transmitters are often not available at all, or are only available at high cost. In order to reduce the resolution of an incremental signal transmitter to a desired degree, mechanical adaptation can be performed, for example by means of a transmission, but this entails an increased space requirement and comparatively high costs.

SUMMARY OF INVENTION

The invention is based on the object of specifying a cost effective device and a method for sensing a position of a door which can be activated automatically.

The object is achieved according to the invention by a device, and a method having the features of the claims.

Advantageous embodiments of the invention are the subject matter of the subclaims.

In the device according to the invention for sensing a position of a door which can be activated automatically, the position can be sensed by an incremental signal transmitter with a first degree of accuracy which is described by a first travel increment or angle increment, and can be fed to a converter, by which the first degree of accuracy of the sensing of the position can be reduced to a second degree of accuracy which is described by a second travel increment or angle increment. Such a converter permits an available incremental signal transmitter which has a finer resolution than the one required to be used. The required resolution can be obtained by means of the converter. In particular, if the incremental signal transmitter which is used is an economical mass produced item, using the converter can be considerably more cost effective compared to the use of a special incremental signal transmitter which is less widespread. If an incremental signal transmitter which has been used hitherto is no longer available, it can be replaced by another one at low cost by means of the converter.

Signals which represent a respectively predefined first travel increment or angle increment which is run through by the incremental signal transmitter can preferably be output by the incremental signal transmitter on a first and a second incremental signal transmitter channel. The signals of the second incremental signal transmitter channel have, compared to the signals of the first incremental signal transmitter given an identical signal shape, a phase shift whose phase angle is positive in the case of a first direction or rotational sense of the incremental signal transmitter, and negative in the case of a second, opposed direction or rotational sense of the incremental signal transmitter. A converter to which the signals of the incremental signal transmitter channels can be fed and by means of which signals which represent a second travel increment or angle increment can be output on a first and second converter channel is connected downstream of the incremental signal transmitter. This second travel increment or angle increment is a predefined integral multiple of the first travel increment or angle increment. The phase shift between the first and second converter channels corresponds to the phase shift between the first and second incremental signal transmitter channels. The incremental signal transmitter channel can, for example, be connected to a motor which drives the elevator door or sliding door in order to sense the position of the door.

The incremental signal transmitter is preferably embodied as a rotary encoder since the position of the motor can thus be sensed particularly easily and precisely. In this case, the incremental signal transmitter supplies an angle increment on its two channels. The rotational sense of the motor and thus the direction of movement of the lift door can be determined by reference to the phase angle of the two incremental signal transmitter channels.

The signals of the incremental signal transmitter and of the converter can be continuous. However, they are preferably binary so that their processing by means of computer equipment or binary logic is simplified.

The phase angle is preferably +90° or −90°. In principle, any value from the intervals 0<phase angle<180° and −180°<phase angle<0 is possible for detecting the rotational sense. A phase angle of 90° or −90° is, however, the only case which is symmetrical for both rotational sensors, which considerably simplifies the processing in the converter.

The second travel increment or angle increment is preferably twice as large as the first travel increment or angle increment since it is particularly frequently necessary to halve the resolution. However, other integral divider ratios can also be implemented without difficulty.

In one preferred embodiment, the converter comprises a microprocessor. In particular when binary signals are used, a microprocessor is most suitable for the programmed implementation of the resolution of the incremental signal transmitter. The implementation is in this way usually more cost effective and above all can be implemented in a more flexible way than with a hard wired logic.

The microprocessor is preferably a microcontroller. Microcontrollers are single chip computer systems which comprise all the components, or a large proportion of the components, of a computer system such as CPU, program memories on ROM or Flash basis, input/output interfaces and, if appropriate, main memories. The converter is in this way possible in a particularly space-saving and cost effective fashion.

A finite automatic apparatus is preferably implemented in the converter, and this can be implemented either with microprocessors or with discrete modules of combinatorial and sequential logic. A finite automatic apparatus is a model of the behavior which comprises states, state transitions and actions and whose set of states is finite. A finite automatic apparatus takes into account in its actions, for example the setting of output signals such as the signals of the converter channels, both a previous state of the input signals, which can not only comprise the incremental signal transmitter channels but also the fed-back converter channels, and also the change of said converter channels to a new state. Such a finite automatic apparatus, also referred to as state machine, is a particularly suitable possible way of implementing the resolution of the incremental signal transmitter without loss of the information relating to the rotational sense or direction.

In one preferred embodiment, changes in state can be classified as legal by the finite automatic apparatus if they have the criteria of a Gray code, and can be classified as illegal if they do not satisfy these criteria. Gray code is a robust coding method in which two successive binary values in a sequence of binary values always change by just one bit. A deviation from this rule is an indication of an error. In the encoding of binary signals on the incremental signal transmitter channels, only the signal of one of the incremental signal transmitter channels ever changes for a given angle or location. If the finite automatic apparatus then identifies a change in both values, it can ignore the state transition or initiate troubleshooting.

The microprocessor can preferably be placed in a defined state by means of a watchdog, and the watchdog can be reset or set by means of the finite automatic apparatus. A watchdog is a safety device which is located in a microprocessor and which ensures the processes implemented on the microprocessor do not come to a complete standstill if one of the processes is in a faulty state. For this purpose, the watchdog usually has a counter which is incremented or decremented. The processes can usually reset or set the counter as long as, for example, they run through loops according to schedule. However, if the counter is not reset or set, this indicates that a process has reached a faulty state. If the counter consequently reaches the set value or the value zero, the watchdog carries out a jump to a process which restores a defined state. In this way it is possible to avoid the converter continuously no longer implementing any signals of the incremental signal transmitter owing to a faulty state.

In one particularly preferred embodiment, the preceding state of at least one of the signals of the incremental signal transmitter channels and/or converter channels can be encoded by means of a jump into one of at least two loops of a program execution which are provided in the finite automatic apparatus, and the state of the converter channels can be changed by a change in state as a function of the loop which is respectively run through. In this way, no main memory or additional register is required for storing the previous state so that it is possible to dispense with a main memory (RAM). As a result, time-consuming memory tests are dispensed with and the converter becomes more cost effective through the elimination of the main memory and the possibility of using microprocessors which are of very simple design. In conjunction with the finite automatic apparatus, a particularly rapid execution with very low consumption of resources is obtained, particularly if the finite automatic apparatus contains a lookup table which is accessed with calculated jumps. In this way each pass can take place with four to five assembler instructions.

BRIEF DESCRIPTION OF THE DRAWINGS

Exemplary embodiments of the invention are explained in more detail below with reference to drawings in which:

FIG. 3 is a program flowchart with the implementation of a finite automatic apparatus for halving the resolution of an incremental signal transmitter.

DETAILED DESCRIPTION OF INVENTION

Figure 1:
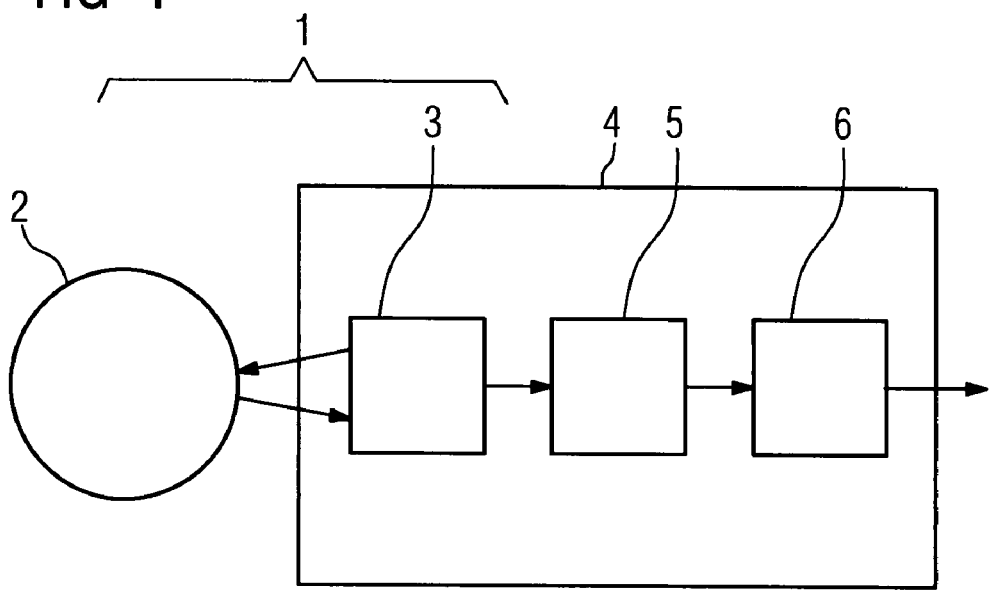
FIG. 1 is a schematic illustration of an incremental signal transmitter with a converter.

FIG. 1 shows a schematic illustration of an incremental signal transmitter 1 with a converter 5. The incremental signal transmitter 1 is embodied as a rotary encoder and comprises a rotatable diaphragm disk 2 which can be connected to the shaft of a drive unit, for example of an electric motor for a door (not shown) which can be activated automatically. Furthermore, the incremental signal transmitter 1 comprises a sensor unit 3 with two optical sensors which detect light which is reflected by the diaphragm disk 2, or light which consists for openings in the diaphragm disk 2. The diaphragm disk 2 is divided in the present example into two hundred angle increments, that is to say each of the sensors registers two hundred pulses per revolution of the diaphragm disk 2. The two sensors are positioned offset with respect to one another here in such a way that one of the sensors receives its signal with a phase shift compared to the other sensor. In the selected example, the phase angle is 90° for a first rotational sense of the diaphragm disk 2, and −90° for a second, opposed rotational sense, so that the rotational sense can be read off from the phase angle of the two signals.

In the present example, the signals are present in binary form at least at the outputs of the sensor unit which are formed by the incremental signal transmitter channels AIN and BIN, which are not illustrated separately. The signal which is received by the sensors is almost always continuous and is digitized by comparators or similar measures. The sensor unit 3 is accommodated on a printed circuit board 4 which also contains the converter 5 and an interface 6. The signals of the incremental signal transmitter channels AIN, BIN are converted by the converter 5 in such a way that signals with half the resolution, that is to say 100 angle increments per revolution of the diaphragm disk 2 are produced on the converter channels AOUT, BOUT (not shown individually) of said converter 5, with the phase shift of 90° or −90° between the signals of the converter channels AOUT, BOUT being maintained. The signals are fed to an interface 6 which in the simplest case comprises only a plug-in connector by which the signals of a control unit (not shown) can be fed for evaluation and further processing.

The converter 5 comprises a microprocessor or microcontroller in which the finite automatic apparatus is implemented by means of software, which automatic apparatus is provided with the state of the incremental signal transmitter channels AIN, BIN and of the converter channels AOUT and BOUT as input signals, and changes or leaves unchanged the signals of the converter channels AOUT, BOUT when, as a function of the previous state, there are changes in the signals of the incremental signal transmitter channels which occur as a result of rotation of the diaphragm disk 2, and triggers troubleshooting when there are illegal changes in state. The converter channels AOUT, BOUT are fed back internally to the inputs of the finite automatic apparatus.

Figure 2:
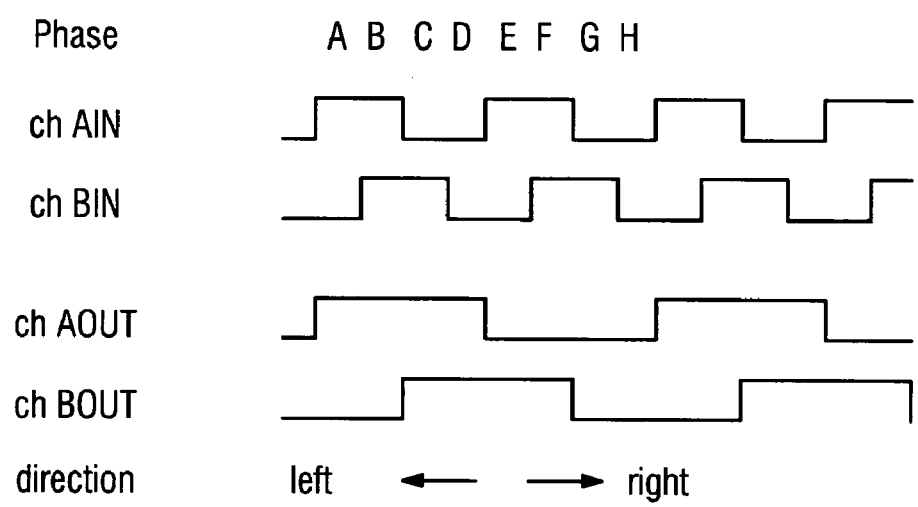
FIG. 2 is a pulse diagram of binary signals of two incremental signal transmitter channels and two converter channels for conversion to half of the resolution of the incremental signal transmitter.

FIG. 2 shows a pulse diagram of binary signals of two incremental signal transmitter channels AIN, BIN and of two converter channels AOUT, BOUT for conversion to the half of the resolution of the incremental signal transmitter 1. The incremental signal transmitter channel AIN shows periodic sequences of pulses which each represent an angle increment. Given a resolution of 200 angle increments per revolution (200 ppr), an angle increment corresponds to an angle of 1.8°. The incremental signal transmitter channel BIN shows the same period sequences of pulses, albeit in a first rotational sense of the incremental transmitter 1 (indicated here by right) following the signal of the incremental signal transmitter channel AIN by 90° phase angle. In contrast, in the opposed rotational sense (indicated here by left), the signal of the incremental signal transmitter channel BIN precedes the signal of the incremental signal transmitter channel AIN by 90°. Among the signals of the incremental signal transmitter channels AIN, BIN which are shown there are the signals of the converter channels AOUT, BOUT which are generated by the converter 5 and which supply a signal with a resolution of 100 ppr, with the phase angle of 90° or −90° between the signals of the converter channels AOUT, BOUT being retained. Phases A to H which are indicated above the signal of the incremental signal transmitter channel AIN shown eight possible states of the input signals of the finite automatic apparatus which repeat periodically. Given the knowledge of the previous state and of the present state, the finite automatic apparatus makes a decision about changing or retaining the signals of the converter channels AOUT, BOUT.

FIG. 3 shows a program flowchart with the implementation of a finite automatic apparatus for halving the resolution of the incremental signal transmitter 1. The finite automatic apparatus starts with a RESET, as a result of which a defined starting state is reached. As a function of the value of the signal on the incremental signal transmitter channel BIN, it subsequently runs through the left-hand loop (BIN=0, low potential) or the right-hand loop (BIN=1, high potential). The division into these two loops is, as a way of determining a state before a state transition which takes into account only the value of the incremental signal transmitter channel BIN, sufficient for conversion with halving of the resolution. The loops are programmed in a ROM or a flash memory. In this way, there is no need for a main memory (RAM). The respective loop is run through continuously without waiting for a change in the signals of the incremental signal transmitter channels AIN, BIN.

At the start of each of the loops, the watchdog is served, that is to say by setting a counter it is prevented from initiating a new RESET. The current state of the signals of the incremental signal transmitter channels AIN, BIN and of the converter channels AOUT, BOUT is subsequently determined and written into selected bits of a working register WREG. The value of this working register WREG is used to calculate a jump. In each of the two loops, that is to say depending on the previous value of the signal on the incremental signal transmitter channel BIN, there are theoretically $2^4$, that is to say sixteen possible states of the input signals, owing to the four signals of the incremental signal transmitter channels AIN, BIN and of the converter channels AOUT, BOUT which are used as input signals. However, since the signals have to satisfy the criteria of a Gray code, in each case four of the states may be evaluated as illegal in each of the loops, which indicates a fault such as, for example, a short circuit between the incremental signal transmitter channels AIN, BIN and leads to troubleshooting and to a jump to the start of the same loop. Given a further eight of the states, no action occurs in any of the loops, that is to say there is no change in the signals of the converter channels AOUT, BOUT. An action in the form of a change in the signals of the converter channels AOUT, BOUT occurs only in the remaining four states. At the address to which the jump which was calculated by means of the working register WREG leads, instructions which are required for the respectively necessary action are processed, that is to say for example the value of an input/output register is changed. This type of indexing of the action to be carried out by means of a calculated jump can also be referred to as a lookup table (LUT). Depending on which state the signal of the incremental signal transmitter channel BIN is in at the particular time, a jump back to the start of the same loop or of the respective other loop occurs in all the states which have not been identified as illegal. Table 1 shows which actions are carried out by the finite automatic apparatus in which state of the input signals as a function of the previous state of the signal of the incremental signal transmitter channel BIN.

TABLE 1

Actions when converting with halving of the resolution

| AIN | BIN | AOUT | BOUT | Action if previously BIN == 0 (left-hand loop) | Action, if previously BIN == 1 (right-hand loop) |
|---|---|---|---|---|---|
| 0 | 0 | 0 | 0 | None | None |
| 0 | 0 | 0 | 1 | AOUT = 1 | Illegal |
| 0 | 0 | 1 | 0 | AOUT = 0 | Illegal |
| 0 | 0 | 1 | 1 | None | None |
| 0 | 1 | 0 | 0 | None | None |
| 0 | 1 | 0 | 1 | None | BOUT = 0 |
| 0 | 1 | 1 | 0 | None | BOUT = 1 |
| 0 | 1 | 1 | 1 | None | None |
| 1 | 0 | 0 | 0 | AOUT = 1 | Illegal |
| 1 | 0 | 0 | 1 | Illegal | None |
| 1 | 0 | 1 | 0 | Illegal | None |
| 1 | 0 | 1 | 1 | AOUT = 0 | Illegal |
| 1 | 1 | 0 | 0 | Illegal | BOUT = 1 |
| 1 | 1 | 0 | 1 | None | None |
| 1 | 1 | 1 | 0 | None | None |
| 1 | 1 | 1 | 1 | Illegal | BOUT = 0 |

A different number of angle increments is possible.

Another integral conversion ratio can easily be obtained by reprogramming the converter 5.

Components which encode a travel increment as signals as a function of a linearly traveled distance are also possible, for example, as incremental signal transmitters 1.

Incremental signal transmitters 1 can act, for example, according to photoelectric or magnetic principles.

The signals of the incremental signal transmitter channels AIN, BIN can also be digitized in the converter 5.

The finite automatic apparatus can be implemented by means of discrete modules of combinatorial and sequential logic without a microprocessor.

A phase angle which differs from 90° or −90° between the incremental signal transmitter channels AIN, BIN is possible within limits.

The invention claimed is:

1. A device for sensing a position of a drive unit, comprising:
    an incremental signal transmitter for sensing the position of the drive unit having a first degree of accuracy that is described by a first travel increment or angle increment; and
    a converter that receives the first degree of accuracy of the sensing of the position and reduces a second degree of accuracy described by a second travel increment or angle increment,
    wherein signals that represent the respectively predefined first travel increment or angle increment sensed by the incremental signal transmitter is output by the incremental signal transmitter on a first and second incremental signal transmitter channel, wherein signals of the second incremental signal transmitter have, compared to the signals of the first incremental signal transmitter channel given an identical waveform, a phase shift whose phase angle is positive in the case of a first direction or rotational sense of the incremental signal transmitter and negative in the case of a second, opposed direction or rotational sense of the incremental signal transmitter, wherein the converter is connected downstream of the incremental signal transmitter, and the signals of the incremental signal transmitter channels are fed to the converter and signals which represent the second travel increment or angle increment which is a predefined integral multiple of the travel increment or angle increment are output on a first and second converter channel by the converter, wherein the phase shift between the first and second converter channels correspond to the phase shift between the first and second incremental signal transmitter channels.

2. The device according to claim 1, wherein the incremental signal transmitter is a rotary encoder.

3. The device as claimed in claim 2, wherein all of the signals are binary.

4. The device as claimed in claim 3, wherein the phase angle is +90° or −90°.

5. The device as claimed in claim 4, wherein the second travel increment or angle increment is twice the value of the first travel increment or angle increment.

6. The device as claimed in claim 5, wherein the converter comprises a microprocessor.

7. The device as claimed in claim 6, wherein the microprocessor is a microcontroller.

8. The device as claimed in claim 7, wherein a finite automatic apparatus is implemented in the converter.

9. The device as claimed in claim 8, wherein the finite automatic apparatus senses the present state of all of the signals, and a preceding state of at least one of the signals, of the incremental signal transmitter channels and/or converter channels and the state of the converter channels are changed in accordance with changes in state.

10. The device as claimed in claim 9, wherein changes in state are classified as legal if they satisfy the criteria of a Gray code and are classified as illegal if they do not satisfy the Gray code criteria.

11. The device as claimed in claim 10, wherein troubleshooting is initiated by an illegal change in state.

12. The apparatus as claimed in claim 11, wherein the microprocessor is placed in a defined state by a watchdog, and the watchdog is set or reset by the finite automatic apparatus.

13. The device as claimed in claim 12, wherein the preceding state of at least one of the signals of the incremental signal transmitter channels and/or converter channels is encoded by a jump into one of a plurality of loops of a program execution which are provided in the finite automatic apparatus, and the state of the converter channels are changed by a change in state as a function of the loop that has been respectively run through.

14. The apparatus as claimed in claim 13, wherein at least one lookup table is provided in the finite automatic apparatus.

15. The device as claimed in claim 14, wherein the drive unit is a motor for a motor-operated door.

16. A method for sensing a position of a drive unit, comprising:

sensing a predefined travel increment or angle increment by an incremental signal transmitter; and outputting on a first and a second incremental signal transmitter channel a sensed travel increment or angle increment signal by the incremental signal transmitter as a function of the position or a change in position of a door, wherein the signals of the second incremental signal transmitter have, compared to the signals of the first incremental signal transmitter channel given an identical waveform, a phase shift whose phase angle is positive in the case of a first direction or rotational sense of the incremental signal transmitter and negative in the case of a second, opposed direction or rotational sense of the incremental signal transmitter, wherein a converter is connected downstream of the incremental signal transmitter, and the signals of the incremental signal transmitter channels are fed to the converter and signals that represent a second travel increment or angle increment which is a predefined integral multiple of the travel increment or angle increment are output on a first and second converter channel by the converter, wherein the phase shift between the first and second converter channels correspond to the phase shift between the first and second incremental signal transmitter channels.

17. The method as claimed in claim 16, wherein a finite automatic apparatus which is implemented in the converter senses the present state of all of the signals, and the preceding state of at least one of the signals, of the incremental signal transmitter channels and/or converter channels, and the state of the converter channels is optionally changed in accordance with changes in state.

18. The method as claimed in claim 17, wherein changes in state are classified by the finite automatic apparatus as legal if they satisfy the criteria of a Gray code and are classified as illegal if they do not satisfy the criteria of the Gray code.

19. The method as claimed in claim 18, wherein the preceding state of at least one of the signals of the incremental signal transmitter channels and/or converter channels are encoded by a jump into one of a plurality of loops of a program execution which are provided in the finite automatic apparatus, and the state of the converter channels are changed or is left unchanged by a change in state as a function of the loop that has been run through.

* * * * *